(12) United States Patent
Kelkar et al.

(10) Patent No.: US 8,095,349 B2
(45) Date of Patent: Jan. 10, 2012

(54) DYNAMIC UPDATING OF SIMULATION MODELS

(75) Inventors: Mohan Kelkar, Tulsa, OK (US); Asnul Bahar, Tulsa, OK (US); Harun Ates, Tulsa, OK (US)

(73) Assignee: Kelkar and Associates, Inc., Tulsa, OK (US)

( * ) Notice: Subject to any disclaimer, the term of this patent is extended or adjusted under 35 U.S.C. 154(b) by 729 days.

(21) Appl. No.: 12/130,463

(22) Filed: May 30, 2008

(65) Prior Publication Data
US 2009/0299714 A1 Dec. 3, 2009

(51) Int. Cl.
G06G 7/48 (2006.01)
(52) U.S. Cl. ............................................. 703/10; 703/9
(58) Field of Classification Search .................. 703/6, 9, 703/10
See application file for complete search history.

(56) References Cited

U.S. PATENT DOCUMENTS

| | | |
|---|---|---|
| 3,079,085 A | 2/1963 | Clark, Jr., et al. |
| 4,821,164 A | 4/1989 | Swanson |
| 5,740,342 A | 4/1998 | Kocberber |
| 6,106,561 A | 8/2000 | Farmer |
| 6,662,109 B2 | 12/2003 | Roggero et al. |
| 6,810,370 B1 | 10/2004 | Watts, III |
| 6,826,520 B1 | 11/2004 | Khan et al. |
| 6,980,940 B1 | 12/2005 | Gurpinar et al. |
| 7,006,959 B1 | 2/2006 | Huh et al. |
| 7,096,122 B2 | 8/2006 | Han |
| 2002/0072883 A1 | 6/2002 | Lim et al. |
| 2002/0169589 A1 | 11/2002 | Banki et al. |
| 2003/0028325 A1 | 2/2003 | Roggero et al. |
| 2003/0110017 A1 | 6/2003 | Guthrie et al. |
| 2004/0220790 A1 | 11/2004 | Cullick et al. |
| 2005/0119911 A1 | 6/2005 | Ayan et al. |
| 2005/0149307 A1 | 7/2005 | Gurpinar et al. |
| 2006/0020438 A1 | 1/2006 | Huh et al. |
| 2006/0036418 A1 | 2/2006 | Pita et al. |
| 2007/0027666 A1 | 2/2007 | Frankel |
| 2007/0156377 A1 | 7/2007 | Gurpinar et al. |
| 2009/0306945 A1* | 12/2009 | Wu et al. .................. 703/2 |

OTHER PUBLICATIONS

King et al., "Reservoir Characterization, Geological Modeling, and Reservoir Simulation of the N'Sano Field, Upper Pinda Reservoir", SPE 39760, 1998, pp. 317-326.*

* cited by examiner

Primary Examiner — Kamini S Shah
Assistant Examiner — Herng-Der Day
(74) Attorney, Agent, or Firm — Fellers, Snider Blankenship, Bailey & Tippens, P.C.

(57) ABSTRACT

The preferred embodiment of the instant invention preferably takes place in three stages. In the first stage, a determination is made as to which sands (or other reservoir bodies) are in fluid communication with the existing wells, and the disconnected sands are removed from the fine scale geological model. In the second stage, the transmissibilities in the fine scale model are upscaled to the coarse grid for direct use in the simulation. In the third stage the connected sands only are upscaled and a simulation is carried forward to the point when a new well is to be drilled. The pressure and saturation data are exported to combine with newly connected sands (reservoir bodies), and new pressure and saturation is calculated. The new values are exported in the simulation model and simulation run is continued.

9 Claims, 4 Drawing Sheets

DYNAMIC UPDATING OF SIMULATION MODELS

TECHNICAL FIELD

This invention relates to the general subject matter of computer simulation of subsurface fluid regimes and, in more particular, to computer simulation of oil and/or gas reservoirs during production.

BACKGROUND OF THE INVENTION

An oil (or gas) reservoir is an accumulation of one or more types of hydrocarbon within porous permeable sedimentary rocks, the hydrocarbons being stored within interconnected pores within those rocks. The pore volume within a reservoir is quantified by a parameter known as porosity, whereas the degree of the interconnection between the pores is referred as permeability. In an actual oil/gas reservoir, both porosity and permeability and other reservoir properties may vary from place to place. The more variation that these and other parameters exhibit spatially the more heterogeneous the reservoir will be.

Figure 3A:
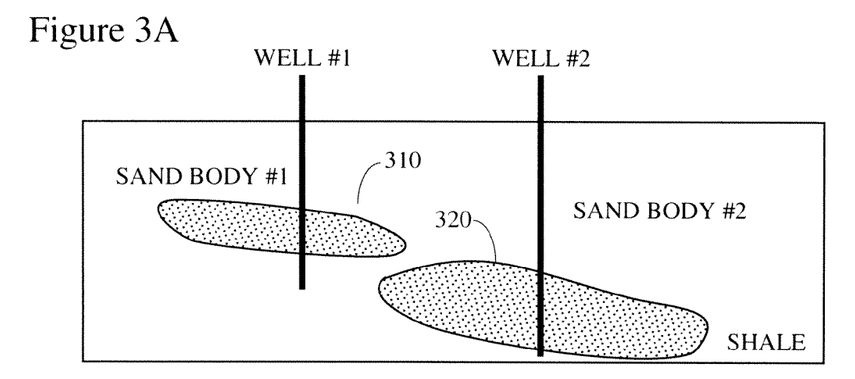
FIGS. 3A and 3B illustrate reservoir heterogeneity and homogeneity, respectively.
Figure 3B:
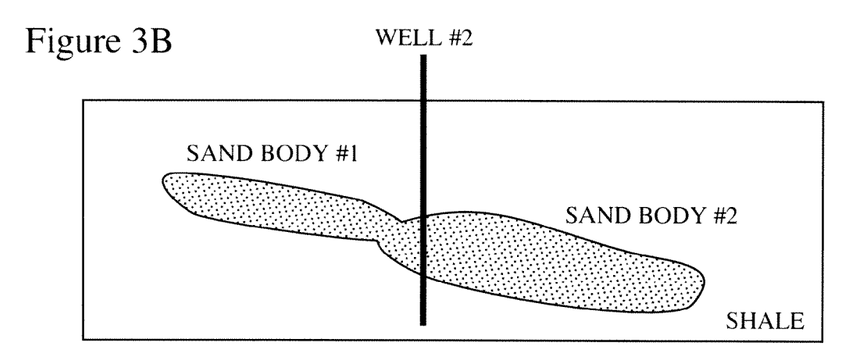

Generally speaking, most reservoirs can be classified as either sandstone reservoirs or carbonate reservoirs based on their composition. Sandstone reservoirs contain elastic materials for the most part, whereas, carbonate reservoirs mostly contain limestone. Both of these types of reservoirs can be either homogeneous or heterogeneous. Homogeneous reservoirs can often be successfully produced (i.e., efficiently drained) by drilling only a few wells into them. Heterogeneous reservoirs on the other hand may need a few more (or many more) wells in order to be fully produced. FIG. 3 conceptually illustrates this point. FIG. 3A contains a simple schematic that illustrates production from a sandstone reservoir that contains two sand bodies 310 and 320 that are encased in a non-permeable rock such as shale. Since the two bodies 310 and 320 are not in fluid communication with each other, two wells will be needed in order to fully drain both bodies 310 and 320—one drilled into each. On the other hand, only a single well might be required if the two sand bodies were connected (FIG. 3B) or otherwise in fluid communication with each other. Obviously, the interconnections between subsurface reservoirs can be of substantial importance to a party who seeks to withdraw hydrocarbons from them.

Numerical reservoir models are regularly used by petroleum engineers and others to help predict the quantity of hydrocarbons that can be withdrawn from a subsurface reservoir and to help manage the process of producing it by, for example, selecting a field or well production rate, determining whether or not enhanced recovery would be cost-effective, etc. As is well known to those of ordinary skill in the art, a reservoir model is a mathematical/digital representation of an underground oil and/or gas reservoir. Generally speaking, reservoir models can be categorized as being either static or dynamic. A static model represents the reservoir without considering the fluid flow within it, whereas a dynamic model represents the reservoir and includes its fluid flow properties.

In both kinds of models, the reservoir simulation process begins by discretizing a subsurface model into a large number of grid blocks, the size of each grid block determining the resolution of the resulting reservoir model. In most cases the grid blocks will be rectangular, but other shapes are certainly possible. Of course, having more grid blocks (i.e., higher resolution) is generally better than having fewer (i.e., lower resolution) since the subsurface tends to be relatively complex. Low resolution models may omit subsurface details that could have a significant impact on production. Thus, generally speaking, the higher the resolution of the model the greater the likelihood that the model results will match those observed in the field. The size of the grid block determines the resolution of the model with small grid blocks being associated with higher resolution models.

Once a grid block system has been established, reservoir properties, such as the type of rock, its porosity and permeability, etc., are assigned to each block using methods well known to those of ordinary skill in the art. In general, such parameters can be reliably determined and assigned to grid blocks that are penetrated by a logged well, but as the distance between a grid block and the nearest well increases, the reliability of the parameters that are assigned to those blocks decreases accordingly. For purposes of the instant disclosure it will be assumed that each grid block is internally homogeneous so that the same physical parameters apply through the block. Of course, those of ordinary skill in the art will recognize that where this assumption is not valid it would certainly be possible to address that problem in any number of ways (e.g., by increasing the resolution/decreasing the size of the grid blocks until each is at least approximately homogenous internally).

A typical static reservoir model might consist of several million (e.g., seven million) grid blocks, whereas a dynamic model will typically consist of only about one million at a maximum. With increasing computer power, these numbers will change. However, the static model will always have higher resolution than the dynamic model. This is because the calculations that predict the behavior of a dynamic model are much more involved than those that would be applied to a corresponding static model. Of course, reducing the resolution of a model is a well-known method of reducing the computer power, memory, etc., required to calculate it. Computing a dynamic model of any significant size at full resolution is not economically feasible given the current state of the art in computer system speeds.

The process of converting a higher-resolution static (or other) model to a lower-resolution model for use in a dynamic model calculation is known as upscaling. This process is typically performed automatically/algorithmically when a high resolution static model is to be used in a dynamic modeling scheme. However, the conventional methods of upscaling are subject to a variety of problems which can introduce errors into a prediction that has been obtained using such models.

Thus, there is a significant difference between the amount of detail that can be accommodated by a static model and that that can be accommodated by a dynamic one. Using current technology and current computer resources, the reservoir modeler may build a static model that consists of many millions of grid blocks. This is done so that the heterogeneity of the reservoir can be replicated as closely as possible within the model. On the other hand, the complexities that are encountered when fluid flow equations are introduced limit the size of the model that modern computers can handle economically. This restriction comes about because of the need for huge amounts of computer memory and long run times if a complete a flow (dynamic) simulation is to be run. Static models that contain multiple millions of grid blocks in size may be readily calculated but, given the current limitations of computer power, a dynamic model can realistically only contain up to a million or so blocks. Thus, this limitation has forced the flow simulation engineer to sacrifice some detail of heterogeneity, and hence, accuracy, in the reservoir model.

Accordingly it should now be recognized, as was recognized by the present inventors, that there exists, and has existed for some time, a very real need for a system and method that would address and solve the above-described problems.

Before proceeding to a description of the present invention, however it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

According to a preferred aspect of the instant invention, there is provided a system and method for upscaling a higher resolution subsurface model to a lower resolution model which does not suffer from the disadvantages of the prior art. The instant invention provides a method of upscaling that results in more accurate dynamic model predictions than have heretofore been possible.

According to a preferred embodiment, the instant invention begins by determining at which well or wells a model prediction is desired. Then, a high resolution/static model will be constructed of a reservoir that is penetrated by the target well (or wells) according to methods well known to those of ordinary skill in the art. As is conventionally done, each grid block in the static model will be assigned various physical parameters that are felt to be representative of that point in the subsurface including such parameters as, for example, a grid block porosity, permeability, etc. Next, a determination will be made as to which grid blocks in the static model are actually in fluid communication with the target well(s). After that determination has been made, those grid blocks that are not in fluid communication will be artificially assigned a hydrocarbon content of zero, and/or assigned a permeability and/or porosity of zero, and/or flagged to be non-productive. In other words, all grid blocks that are not in fluid communication with the target well(s) will be deemed to be non-reservoir rocks, whether or not they might actually contain hydrocarbons. Thus, oil that might be present in the subsurface within the limits of the model but that that cannot be produced from the target well(s) will be excluded from the model calculations.

The now modified model will then next be preferably upscaled as is conventionally done. A dynamic prediction will then be performed on the upscaled modified model and the results used to assist in the production of fluids from the target well(s).

The existence and magnitude of errors that are introduced by upscaling reservoir models has been a major issue in reservoir description process for some time. Although others have sought to improve the process, no method developed heretofore exhibits the advantages that the instant method does. More particularly, the prior art has failed to address the issue of disconnected sand (reservoir bodies), and how to properly combine transmissibilities of multiple grid blocks, etc.

According to another preferred embodiment there is provided method of calculating transmissibility between two model blocks that results in upscaled models that are more representative of the subsurface than have been available heretofore. A method of combining the transmissibilities of multiple blocks into a single value for use in an upscaled model is presented below.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 10 contains the results of a numerical simulation of an upscaled version of FIG. 7, wherein transmissibilities are properly accounted for.

DETAILED DESCRIPTION

While this invention is susceptible of embodiment in many different forms, there is shown in the drawings, and will be described hereinafter in detail, some specific embodiments of the instant invention. It should be understood, however, that the present disclosure is to be considered an exemplification of the principles of the invention and is not intended to limit the invention to the specific embodiments or algorithms so described.

According to a first preferred embodiment, there is provided an improved method of oil production management which utilizes a modified upscaled model to obtain better production predictions than has been possible heretofore.

Generally speaking, the instant invention operates by introducing sand or other bodies (i.e., new reservoir volumes) into the subsurface model at the appropriate time. Note that for purposes of the instant invention, the term "appropriate time" will be understood to mean introduced at the time when each sand body is actually connected to—or in fluid communication with—an existing well. Thus, when a sand body is not in such communication it will be considered for upscaling purposes to be non-reservoir rock.

General Environment of the Invention

During the reservoir description process, estimates of subsurface physical parameters such as porosity, permeability, pressure, temperature, saturation, etc., will be assigned to each grid block within a model. The exact physical parameters within each grid block are difficult, if not impossible, to determine with any certainty away from the well bore. Still, well known methods exist for estimating such given some degree of homogeneity in the reservoir rocks (e.g., extrapolation or interpolation using statistical, geostatistical, or other techniques). To the extent that the grid block properties are representative of those in the subsurface, the final prediction will, of course, be more accurate.

Figure 1:
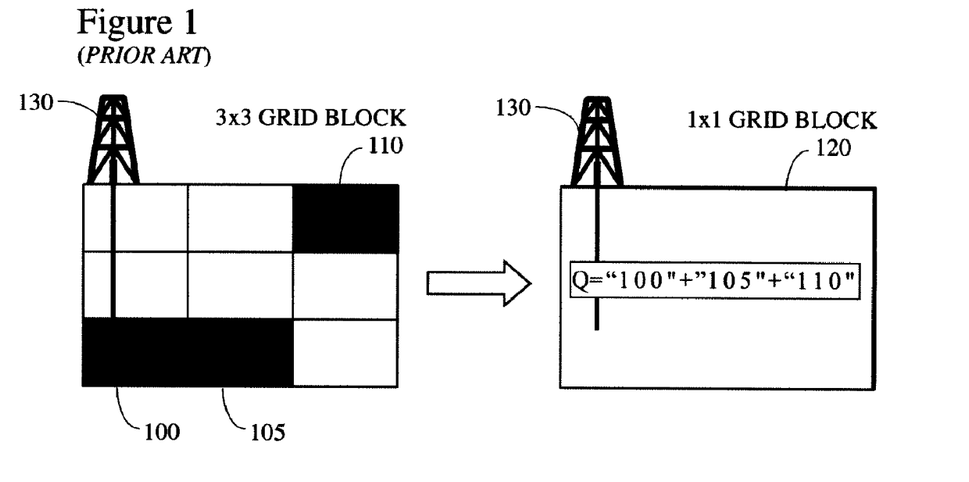
FIG. 1 illustrates a general environment of the instant invention.

As is well known to those of ordinary skill in the art, although the static model might be populated with the best available data, in some instances the process of upscaling it can introduce systematic errors that can impact the economics of a project. For example, FIG. 1 illustrates one such problem. As is generally indicated in this simplistic 2D example, the 3×3 grid on the left contains nine blocks, three of which contain producible oil (or other hydrocarbons), i.e., blocks 100, 105, and 110, with the remaining blocks being non-producing. Note that blocks 100 and 105 are not in hydraulic communication with block 110. Thus, a well that is drilled into either of blocks 100 or 105 will only produce the oil contained in those two blocks. The oil in block 110 will be left in place unless a second well is drilled.

For purposes of the instant example, assume that these nine grid blocks are to be upscaled to form the single block 120 on the right. It is typical in such a scenario to determine the quantity of oil that is to be allocated to the resulting single large block 120 by summing together the oil that is available from all three of the blocks 100, 105, and 110, i.e. the producible quantity "Q" equals the sum of the estimated producible hydrocarbon quantities from all three block. However, if such an approach is used in the example of FIG. 1 the total amount of oil in the single large block after upscaling 315 will overstate the amount of oil that can actually be produced from the single well 130. Thus, any model results that depend on this input will similarly be inaccurate.

This sort of faulty assumption can (and has) cause the predicted output as obtained from the model to overestimate the total amount of oil that can actually be produced. This can result in uneconomic decisions as to whether or not to drill a prospective well. So, in effect, by upscaling the blocks in the conventional fashion, the oil that can be produced from the upscaled block will be overestimated, and the oil that can be produced by drilling another well in block 110 will be underestimated.

Finally, after the physical parameters have been assigned to each block in the model, the static modeling process is more or less at its end. Subsequently, fluid flow is simulated in the (upscaled) system via a mathematical relationship known as Darcy's law. This equation is the starting point of the dynamic modeling process. As is well known to those of ordinary skill in the art, during the dynamic modeling process the actual production history from each well can be compared with the simulated value obtained as output from the model in order to test or verify the accuracy of the model. The model is considered to be a good one when it can reproduce the actual history of a well within a certain tolerance.

Preferred Embodiments

Figure 2:
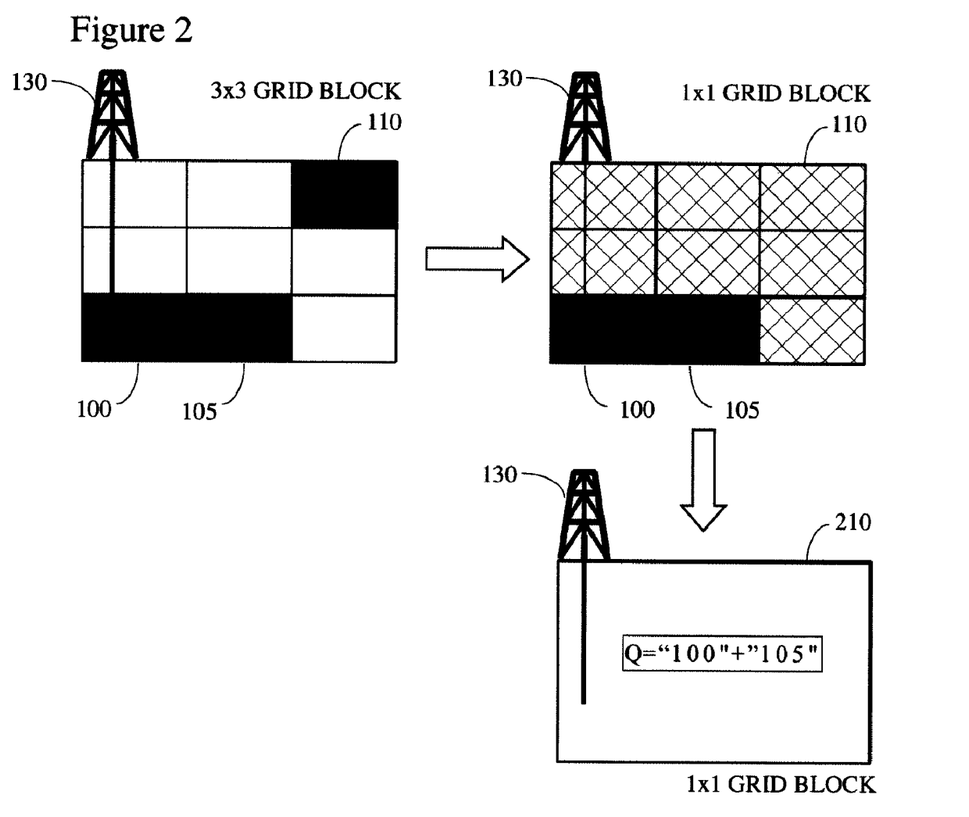
FIG. 2 a schematic illustration of a preferred embodiment.

Turning next to a discussion of some preferred embodiments of the instant invention, the inventor has determined a method of upscaling a static model of a subsurface reservoir that produces more accurate dynamic model results than has heretofore been possible. As is generally illustrated in FIG. 2, the instant method of upscaling operates on a static model by flagging as non-producing all of the non-producing blocks in the grid (the white blocks) as is conventionally done. Then, the remaining blocks that contain hydrocarbons and which are not in fluid communication with the main reservoir (e.g., isolated block 110) or target well are similarly flagged as non-producing. Non-producing blocks in FIG. 2 have been marked by cross-hatching.

After each block in the model has been identified as being producing or non-producing, the grid is coarsened (upscaled) as is typically done, bearing in mind each block's potentially new designation. Afterward, a dynamic model calculation will then be applied to the modified grid block system. However, after preprocessing by the instant invention the dynamic model hydrocarbon estimates as calculated from the coarser grid elements 205 will now be more reflective of the quantity of hydrocarbons that can actually be produced from the target well. As a consequence, the resulting dynamic model results will be more accurate than has been possible heretofore based on an upscaled grid block The instant method has a further advantage that, if after few years a new well is contemplated which would intersect block 110, then the proposed method will allow combining the production obtainable from the "virgin" (yet to be depleted) block with that already obtained and obtainable in the future from depleted blocks 100 and 105 to provide a more realistic economic analysis, i.e., the producible quantity "Q" is the two of the two blocks that are in fluid communication. Thus, the prediction of the production from the original well as well as that obtainable from the newly drilled well will correctly reflect the total oil volume that can be produced in this subsurface configuration.

According to a first preferred embodiment, the following sorts of information will be useful in the preparation of a reservoir model and in the implementation of the instant invention:

1. A history of well completion (time and location) such that connected sand (reservoir) bodies can be evaluated at different times.
2. The transmissibility calculation in the fine scale model (how the grid blocks are connected at fine scale level).
3. The initial pressure and saturation of all sand or other reservoir bodies.
4. The pressure and saturation of the sand bodi(es) that have been previously connected to the well system at any time step during the flow simulation process.
5. The pressure and saturation from upscaled model when newly connected sand bodies are to be introduced into the upscaled model.

In principle, the above process can be broadly divided into three preferred stages.

Stage 1: During the first stage a determination is preferably made of those sands (or other reservoir bodies) that are in fluid communication with the existing wells. Additionally, disconnected sands will be removed from the fine scale geological model, preferably by redefining them to be non-producing.

Stage 2: In the second stage, the transmissibility in fine scale model will preferably be upscaled to the coarse grid. These upscaled transmissibilities are then preferably directly used in simulation. The details of this step are explained below.

Stage 3: Finally, preferably only the connected sands (reservoir bodies) are upscaled and the simulation is carried forward to the point a new well is drilled. The pressure and saturation data from the originally connected sands (reservoir bodies) are then combined with newly connected sands (reservoir bodies) to determine the new pressure and saturation distributions. The new values are once again imported into the simulation model and simulation run is continued till the next set of wells are drilled, etc.

Turning now to a detailed discussion of the instant invention, some preferred steps in the instant approach are as follows:

1. Obtain a fine scale geological model of the subsurface in the region where the simulation is to be conducted, i.e., the model will include one or more target wells whose performance is to be predicted.

The model might be constructed in many ways but those of ordinary skill in the art will recognize that geological cross sections that are based on well logs and other down hole data (e.g., core data) obtained from an existing grid of wells are often useful in this context and provide information such as layer tops, rock type, permeability, porosity, temperature, pressure, etc. Additionally, the well data might be augmented with structural and stratigraphic information (including identification of oil/water and gas/water contacts, etc.) from a seismic survey collected proximate to the target well(s) and, where applicable, rock properties that have been estimated therefrom. Further, gravity and/or magnetic surveys might provide still more information about the configuration of the basement and/or reservoir rocks away from the existing wells. Preferably the resulting geo-cellular model will have a resolution which is consistent with or no worse than that provided by the well log data. Note that in the preferred embodiment the model will be three dimensional and each grid block in the model will similarly be 3D. Information from these sorts of sources will then be used to assign physical parameters (e.g., permeability, porosity, transmissibility, hydrocarbon content, water content, gas content, etc.) to the grid blocks in the model according to methods well known to those of ordinary skill in the art and/or according to the methods taught herein.

2. Based on the existing well locations, determine the connected sands (reservoir bodies) to a target well and identify the disconnected sands (reservoir bodies) which are not connected to any existing wells. Remove the disconnected sands from the geo-cellular model and replace them with non-reservoir rock.

Although this might be done in many ways, in some preferred embodiments a computer program will search out interconnected regions of porosity/permeability. In other scenarios, a user at a computer workstation will examine 3D cross sections or other displays and manually select some or all of the disconnected reservoir bodies. In still other variations, some combination of the foregoing will be used.

Preferably, once the disconnected sands or, more precisely, the grid blocks corresponding to disconnected sands, have been identified they will be effectively removed from the model calculations by flagging them as nonproductive. Those of ordinary skill in the art will recognize that this might be done in many ways. In some preferred embodiments the porosity and/or permeability of the disconnected grid blocks will be artificially set to be zero (or approximately so). In other instances, the rock type may be changed to, for example, an impermeable shale, granite, etc. In other instances, the hydrocarbon content of flagged grid blocks might be set equal to zero. In any case, for purposes of the instant disclosure and the claims that follow the term "flagging as nonproductive" will be used to signify instances where the upscaling program has been signaled to ignore the hydrocarbon content of a block, what ever form that signal might take.

3. Upscale the model after removal of disconnected sands to a desired level—the desired level represents a coarse level for which the performance of a fine scale model using "existing" wells can be reasonably reproduced with the coarse model.

As a next preferred step, the modified original model (i.e., the model containing flagged grid blocks) will be upscaled according to methods well known to those of ordinary skill in the art. Of course, the best degree of upscaling to apply is a decision that will depend on the circumstances and may need to be determined on a trial and error basis in some situations. In other scenarios, past experience with this play or the modeling program may give guidance. However, selection of the degree of upscaling is a decision that is well within those of ordinary skill in the art.

4. Upscale transmissibility for direct input into simulation models. A preferred method of doing this will be discussed in greater detail below.

5. If in-fill (additional in-field) drilling is planned after certain number of years, stop the flow simulation at that time and output the pressure, saturation and solution gas ratio at the end of that period.

i. Depending on the proposed location of the new/in-fill wells, re-examine the original fine scale model and recalculate/redetermine the connected and disconnected sands (reservoir bodies). Remove the disconnected sands from the model based on the new well configuration by flagging them as nonproductive. Recalculate the upscaled model using the newly connected sands and generate a new upscaled model (porosity and transmissibility).

ii. Examine the pressure and saturation from the simulator output. If a new sand is now connected to an old (already depleted) sand, based on the overall volume, conduct a material balance and re-calculate saturation and pressure in the new upscaled model. This is an important step to correct for the changes in pressure and saturation due to additional untapped (virgin) hydrocarbon into the upscaled model. The equation needed for this calculation is presented in below.

6. Using the new variables (pressure, saturation, porosity, permeability, etc.), begin the simulation including the existing and the new in fill wells.

According to another preferred aspect of the instant invention, there is provided a method of calculating transmissibility that is more effective than has been available heretofore. Those of ordinary skill in the art will recognize that transmissibility defines the effective connectivity between two adjacent grid blocks. Thus, what is likely most useful for input to a reservoir simulator is not the effective permeabilities of the coarse blocks, but rather transmissibilities from each block to each of its neighbors.

Figure 4:
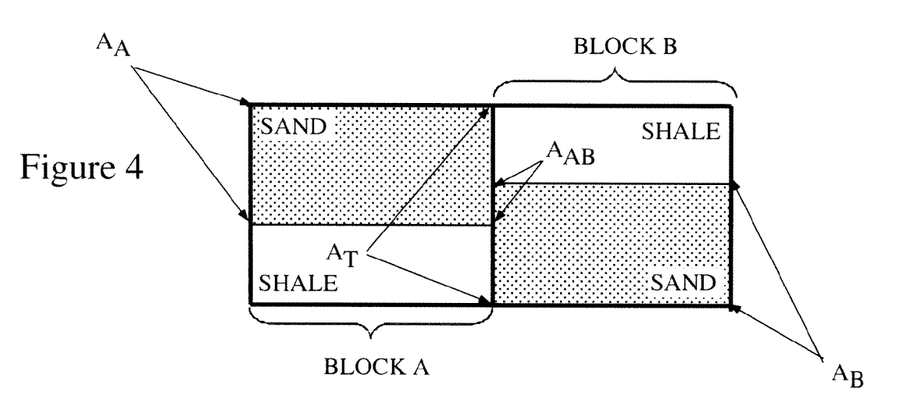
FIG. 4 illustrates how transmissibilities should be viewed in practice.

FIG. 4 illustrates this point. FIG. 4 shows an end view of a partial sand face connection in two adjacent grid blocks. Each coarse block (A and B) consists of two fine blocks, one of which is sandstone and the other shale. Let $A_A$ be the cross sectional area of the sand component of block A, $A_B$ be the cross sectional area of sand in block B, and $A_{AB}$ be the overlap area between the two sand bodies. Let $T_{x,AB}$ be the desired transmissibility from block A to block B. Let $T_{x,A}$ be the transmissibility of sand in Block A, and $T_{x,B}$ be the transmissibility of sand in Block B. Then, the correct transmissibility can be calculated using the following equation.

$$T_{X,AB} = \frac{A_{AB}}{\frac{A_A}{T_{X,A}} + \frac{A_B}{T_{X,B}}}$$

A major problem in standard transmissibility calculations is the correct representation of $A_{AB}$ in flow simulations. The input to dynamic simulators typically includes only the upscaled properties and which preserve little to no fine scale geological details. As a result, the connected area between fine scale sands are often misrepresented causing differences in connectivity between upscaled cells as compared to the connectivity between fine scale geological models. This altered connectivity (transmissibility) distribution can create significant behavioral differences when upscaled and geological models are compared. For the example illustrated in FIG. 4, the transmissibility of the upscaled model will be calculated using "$A_T$", the total area between coarse blocks. Note that there is a significant difference between upscaled grid block area $A_T$ and the true sand contact area ($A_{AB}$).

The previous equation simply expresses the fact that resistances (i.e., reciprocals of transmissibilities) are additive in the direction of flow. This additive nature provides a very convenient way of calculating upscaled transmissibilities at fine block boundaries. These half block transmissibilities in the previous equation can be defined using standard transmissibility equations as, $$T_{X,A} = \frac{Q_{X,A}}{(P_{A,L} - P_{A,R})}$$

In the previous equation, $Q_{X,A}$ represents the flow in the x direction through the sand area in block A, $P_{A,L}$ is the pressure at the left boundary of block A, $P_{A,R}$ is the pressure at the right boundary of block A. Those of ordinary skill in the art will recognize that the previous equation can readily be modified for transmissibilities in the Y and Z directions.

Figure 5:
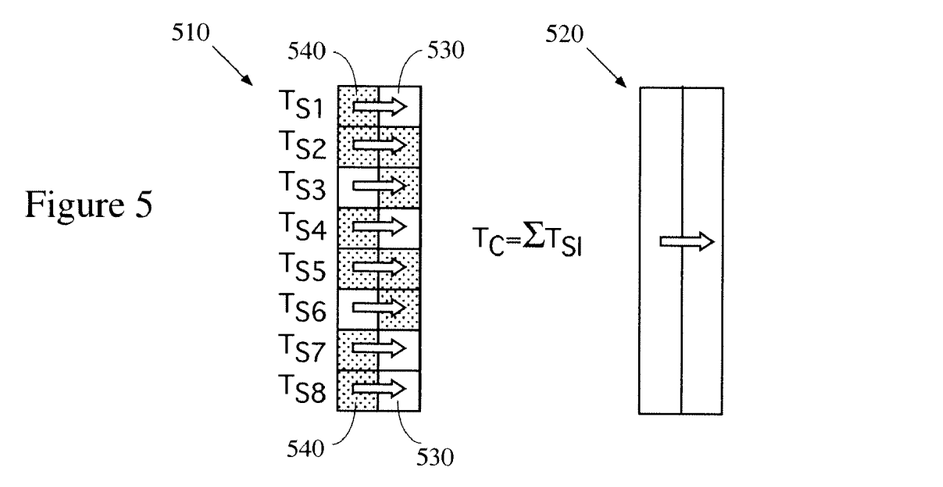
FIG. 5 illustrates how the transmissibilities of multiple grid blocks should be properly collapsed to a single value during upscaling.

Once the fine scale transmissibilities are calculated using this method, then transmissibilities can be arithmetically added to calculate upscaled transmissibility. FIG. 5 illustrates a preferred process of upscaling transmissibilities. On the left side of FIG. 5 is a schematic representation of a fine scale distribution 510. The transmissibilities are calculated based on the fine scale model. Because of sand 540/shale 530 interfaces, notice that only $2^{nd}$ and $5^{th}$ rows have sand-to-sand contact. Thus, the other fine scale transmissibilites will be zero. The homogeneous coarsened block 520 represents what happens when the fine scale model 510 is coarsened. The upscaled transmissibility will preferably be the addition (or summation) of the individual fine scale transmissibilities. In this particular figure, transmissibility for the upscaled block would be only the sum of the $2^{nd}$ and $5^{th}$ transmissibility values since all the other values are zero. This approach would allow correct determination of connectivity between the coarse blocks. On the other hand, if the coarse scale transmissibility is determined based on the coarse scale homogenized values, a much higher incorrect value would be obtained.

Note that simple addition of transmissibilities is only strictly correct when the flow direction is perpendicular to the fine grids that are to be upscaled. Therefore, this approach may not be best when areal upscaling is to be considered.

However, A more general approach can be developed if it is recognized that the discrepancy between upscaled and fine scale transmissibility is largely due to the misrepresentation of connected sand area ($A_{AB}$) between two coarse blocks ($A_T$) (e.g., FIG. 4). The following is a preferred stepwise approach to properly adjusting coarse block transmissibility to reflect the true fine scale transmissibility.

1. Calculate the coarse block transmissibility using a standard approach.
2. Using fine scale geological distributions, calculate the connected sand area within a particular coarse block face depending on the flow direction (x, y, or z).
3. Using fine scale geological distributions, calculate the total sand area within a particular coarse face depending on the flow direction (x, y, or z).
4. Calculate the ratio of connected and total sand areas at a particular coarse block face.
5. Multiply the coarse block transmissibility calculated in Step 1 with the ratio calculated in the previous step (Step 4) to obtain a corrected directional transmissibility.

The procedure will give exactly the same result if the fine scale transmissibilities are summed to calculate the coarse block transmissibility when there is no areal upscaling involved. However, unlike transmissibility summation, the areal adjustment provides a more general approach that can also be used when area upscaling is involved.

Note that, generally speaking, transmissibilities are dynamic flow-dependent parameters. However, according to the preferred embodiment the static transmissibility calculations will only be considered at equilibrium conditions before production starts. This is typically a reasonable approximation since static transmissibility is what is distorted due to upscaling process and dynamic transmissibilities due to flow in the reservoir are correctly calculated by the simulators used.

Although, the explanations above are based on sand-shale distributions (i.e. elastic oil reservoirs), those of ordinary skill in the art will recognize that the previous methodology can readily be adapted to carbonate reservoirs as well. For carbonate reservoirs, the rock types and/or petrophysical properties that represent the non-reservoir rocks will need to be determined, as will those that represent the reservoir rock. Once these determinations are made, the process described above can be applied.

Turning now to another preferred embodiment, the instant inventor has discovered a method of using a material balance system of equations to calculate an updated pressure and model solution after newly connected sand bodies have been introduced into the model. That is, the equation for calculating the pressure and saturation which results when a newly connected sand is introduced into a model can be established using material balance concepts. This approach can be particularly useful when a simulation run result (which might have required substantial computer resources to obtain) is to be updated upon the introduction of a new producible hydrocarbon amounts into the system. In some instances, the additional hydrocarbons will sourced from a new well that penetrates reservoir rock not previously tapped. In other cases, additional hydrocarbons might be added to the system by virtue of new production from an interval in an existing well that was not produced previously. In other cases, the additional well(s) might be drilled into a part of a reservoir that is currently represented within the model but which has not been effectively drained by the existing well(s). Those of ordinary skill in the art will recognize the sorts of situations in which the approach described hereinafter might be similarly useful.

Figure 6:
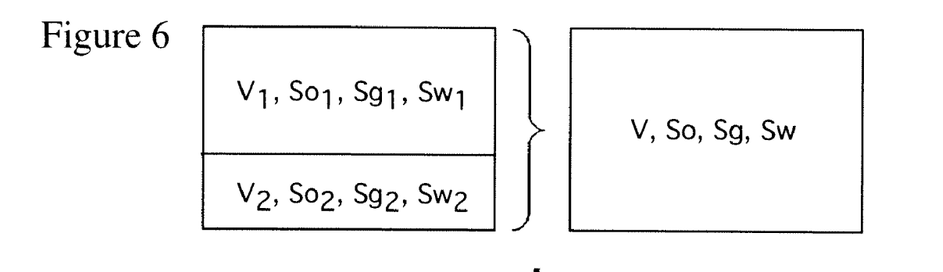
FIG. 6 is a simple model that is used to illustrate the application of material balance equations to an upscaling problem.

Consider the combination of two grid blocks with different pore volumes and saturations into a single grid block as is shown in FIG. 6. The material balance equation for the oil phase of a 3-phase (oil, water and gas) system can be written as $$\frac{V_1 So_1}{Bo_1} + \frac{V_2 So_2}{Bo_2} = \frac{V_1 + V_2}{Bo} So.$$

Similarly, the equation for gas is, $$\left(\frac{V_1 So_1}{Bo_1} Rs_1 + \frac{V_1 Sg_1}{Bg_1}\right) + \left(\frac{V_2 So_2}{Bo_2} Rs_2 + \frac{V_2 Sg_2}{Bg_2}\right) = \frac{(V_1 + V_2)So}{Bo} Rs + \frac{(V_1 + V_2)Sg}{Bg},$$

and the equation that describes the water system is, $$\frac{V_1 Sw_1}{Bw_1} + \frac{V_2 Sw_2}{Bw_2} = \frac{V_1 + V_2}{Bw} Sw.$$

In the previous equations, the index "1" represents grid block 1 and index "2" represents the grid block 2. Here, V represents the pore volume, So represents the combined oil saturation, Sw represents the water saturation, and Sg represents the gas saturation. Rs is the solution gas ratio and Bo, Bw and Bg are the formation volume factors for oil, water and gas, respectively. Solving the above 3 equations, produces the following equations:

$$So = \frac{Bo}{(V_1 + V_2)} \left(\frac{V_1 So_1}{Bo_1} + \frac{V_2 So_2}{Bo_2}\right)$$

$$Sg = \frac{Bg}{(V_1 + V_2)} \left(\left(\frac{V_1 So_1}{Bo_1} Rs_1 + \frac{V_1 Sg_1}{Bg_1}\right) + \left(\frac{V_2 So_2}{Bo_2} Rs_2 + \frac{V_2 Sg_2}{Bg_2}\right)\right) - RsSoB_g/B_o$$

Although the previous equations were formulated for only two grid blocks, the method may readily be extended to an arbitrary number of blocks "N" as follows:

$$So = \frac{Bo}{\sum_{i=1}^{N} V_i} \left(\sum_{i=1}^{N} \frac{V_i So_i}{Bo_i}\right)$$

$$Sg = \left(\frac{\sum_{i=1}^{N} \left(\frac{V_i So_i}{Bo_i} Rs_i + \frac{V_i Sg_i}{Bg_i}\right)}{\sum_{i=1}^{N} V_i} - \frac{SoRs}{Bo}\right) Bg$$

$$Sw = \frac{Bw}{\sum_{i=1}^{N} V_i} \left(\sum_{i=1}^{N} \frac{V_i Sw_i}{Bw_i}\right)$$

The previous set of equations can be solved by using the fact that the summation of all of the constituent saturations must be identically equal to 1.0. That is, $$So + Sg + Sw = 1$$

Thus, the solution of the previous system of equations can be obtained by finding a pressure that produces in a zero in the function "F" defined below.

$$F = So + Sg + Sw - 1 = 0$$

Finding a pressure that solves the previous equation will likely require a numerical solution using, for example, the well-known Newton Raphson iterative method. The formulation of numerical solutions to equations such those above is well within the ability of one of ordinary skill in the art.

Figure 7:
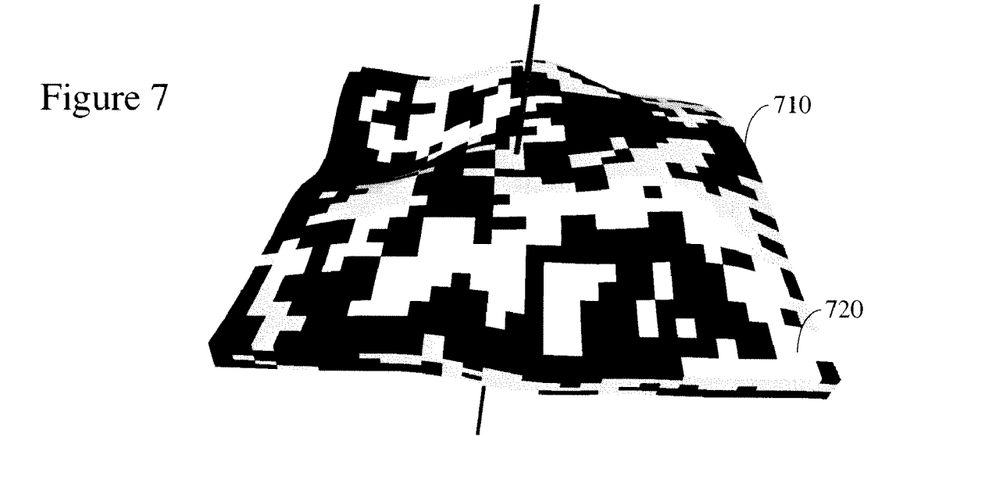
FIG. 7 illustrates a five-layer static reservoir model.
Figure 8:
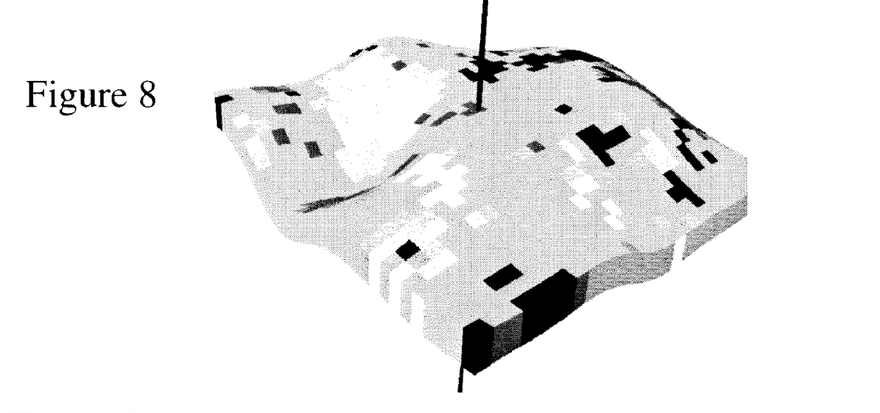
FIG. 8 illustrates the upscaled permeabilities associated with the model of FIG. 7.

Finally, FIG. 7 contains a schematic illustration of a simple five-layer model that will be used to illustrate some features of the instant invention. FIG. 7 is a 36×36×5 model which contains various combinations of sand 720 (i.e., the lighter patches) and shale 710 (i.e., the darker patches). For purposes of simplicity, it will be assumed that only one well has been drilled into this formation. The location of the well will be the point against which fluid communications throughout the model will be tested, i.e., sand bodies will only be included in the upscaled model if they are in fluid communication with the well. After filtering the sand bodies that are not connecting to the well, porosity and permeability are upscaled to a single layer. FIG. 8 shows the single layer model permeabilities with darker shades corresponding to grid blocks that are less permeable.

Figure 9:
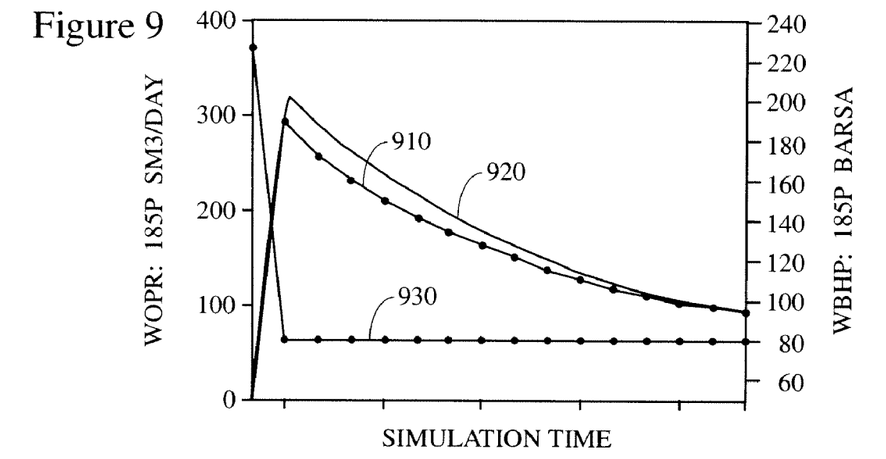
FIG. 9 contains the results of one numerical simulation of an upscaled version of FIG. 7.

Ideally, one would expect that a one layer and five layer models having identical pore volume and productivity ("KH") would have the exactly the same dynamic behavior. However, FIG. 9 shows that indeed they behave differently, despite both models being subjected to production under the same bottom hole pressure conditions ("BHP") 930. Curve 920 represents the production that would be expected if the connected sands were to be upscaled according to the instant invention. This should be compared with curve 910 which represents the "true" (i.e., full resolution) computation based on the five layer model.

Figure 10:
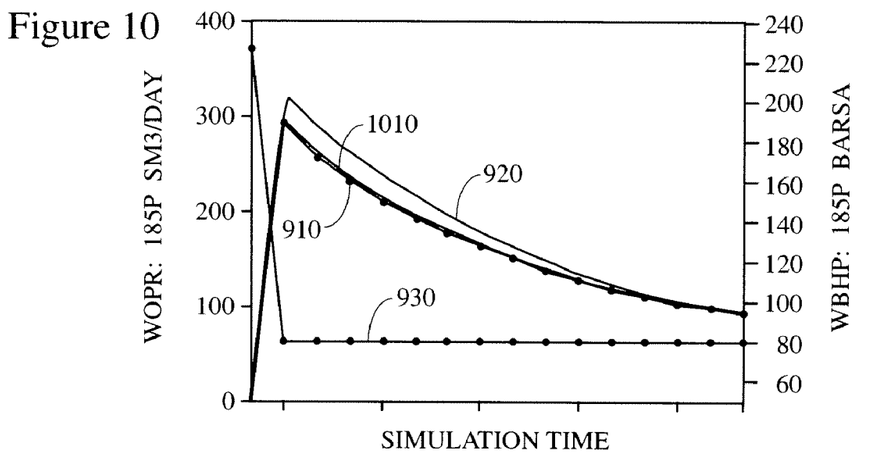

Note that, although in many cases curves 910 and 920 would be expected to overlay each other, this example was specifically constructed to illustrate the role that transmissibilities can play in the operation of the instant invention in practice. This figure shows that in many scenarios the transmissibility at grid block boundaries needs to be preserved during the upscaling process. Even if the best possible upscaling method is used, the prediction may still not be sufficiently accurate unless there is a methodology for correct the transmissibility alteration at grid boundaries FIG. 10 illustrates how the model calculation results change if transmissibilites are considered. As has been explained previously, the instant invention upscales transmissibility in the x, y and z directions such that the transmissibility of the upscaled model approximates the fine scale model transmissibility at initial conditions. Once the upscaled transmissibilities are calculated based on the fine scale model, they should be directly input to the flow simulator, as has been done with Curve 1010. Curve 1010 in FIG. 10 shows an excellent match between fine scale and coarse scale behavior when the model is corrected to account for transmissibilities.

Conclusions

The instant invention is designed to produce dynamic reservoir model results that are more accurate than has heretofore been possible. Two main differences between conventional upscaling and the approach taught here are:

1. The instant method accounts for the actual hydrocarbon volumes that are in fluid communication with the wells—as a function of time; and, 2. The instant method provides a means for upscaling of transmissibilities to correct for interwell connectivity distortions that can arise with conventional upscaling methods.

Further, the instant invention has several important advantages of the prior art. First, it allows significant upscaling of fine scale models without increasing the connected volume of the reservoir to the wells. This will make the simulation of the reservoir more efficient. Second, the instant invention provides for correct evaluation of newly drilled wells by adding newly connected volumes into the reservoir. Those of ordinary skill in the art will recognize that prediction of the performance for newly drilled wells is very important for determining economic evaluation of reservoir development process. Finally, the instant invention correctly predicts the performance of water floods or other enhanced oil recovery floods by properly accounting for connected volumes, and transmissibilities between injectors and producers.

Although the much of the instant disclosure has been couched in terms of "sands" as reservoir rocks and "shales" as impermeable/non-reservoir rocks, that was not done out of any intention to limit the invention to operating only on specific lithologies. Those of ordinary skill in the art will recognize that the instant invention is suitable for operation with any type of reservoir or non-reservoir rock.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of managing a production of hydrocarbons from a subsurface formation via a well drilled into the subsurface formation, comprising the steps of:
   a. forming a model of a subsurface of the earth including at least a portion of said subsurface formation, thereby forming a subsurface model;
   b. discritizing said subsurface model, thereby obtaining a plurality of grid blocks representative of said subsurface model;
   c. assigning at least one physical parameter value to each grid block of said plurality of grid blocks, wherein said at least one physical parameter assigned to each grid block comprises a permeability and an X-direction transmissibility, a Y-direction transmissibility, and a Z-direction transmissibility;
   d. allocating at least a portion of the hydrocarbons in the subsurface formation to two or more of said plurality of said grid blocks, thereby creating a plurality of hydrocarbon blocks;
   e. determining which of said plurality of hydrocarbon blocks is not in fluid communication with the well, thereby determining at least one non-communicating block;
   f. flagging as nonproductive each of said at least one non-communicating block;
   g. using at least said assigned permeability of each of said plurality of grid blocks, said plurality of hydrocarbon blocks, and said at least one flagged noncommunicating block to upscale said subsurface model, thereby producing an upscaled subsurface model comprised of at least two upscaled subsurface grid blocks, and,
      using at least said assigned X-direction transmissibility, said Y-direction transmissibility, and said Z-direction transmissibility of each of said plurality of grid blocks to produce an upscaled transmissibility model commensurate in size with upscaled subsurface model;
   h. performing a dynamic reservoir computer simulation using at least said upscaled subsurface model and said upscaled transmissibility model, thereby obtaining simulation results; and,
   i. using at least a portion of said simulation results to manage production of hydrocarbons via the well.

2. The method of managing a production of hydrocarbons in a subsurface formation according to claim 1, wherein the hydrocarbons are selected from a group consisting of oil, gas, and, a combination of oil and gas.

3. The method of managing a production of hydrocarbons in a subsurface formation according to claim 1, wherein step (h) comprises the step of:
   (h1) performing a dynamic reservoir computer simulation using at least said upscaled subsurface model, thereby obtaining simulation results, said simulation results at least comprising an estimate of a pressure and a saturation within each of said grid blocks in fluid communication with the well.

4. The method of managing production of hydrocarbons in a subsurface formation according to claim 1, wherein step (f) comprises the step of:
   (f1) flagging as nonproductive each of said at least one non-communicating block by allocating zero hydrocarbons to each of said at least one non-communicating block.

5. The method of managing a production of hydrocarbons in a subsurface formation according to claim 1, wherein step (h) comprises the steps of:
   (h1) performing a dynamic reservoir computer simulation using at least said upscaled subsurface model and said upscaled transmissibility model, thereby obtaining initial simulation results comprising at least a saturation and a pressure in each of said grid blocks in fluid communication with the well,
   (h2) adding an additional quantity of hydrocarbons to at least one of said plurality of grid blocks representative of said subsurface model using at least one material balance equation to obtain a modified saturation and a modified pressure in at least one of said grid blocks to which said additional quantity of hydrocarbons has been added, thereby obtaining simulation results.

6. A method of producing hydrocarbons from a well in fluid communication with at least one subsurface hydrocarbon reservoir, comprising the steps of:
   a. forming a model of a subsurface of the earth containing at least a portion of said at least one subsurface hydrocarbon reservoir, thereby forming a subsurface model;
   b. discritizing said subsurface model, thereby obtaining a plurality of grid blocks representative of said subsurface model, and
      determining at least one physical parameter associated with each grid block of said plurality of grid blocks, wherein said at least one physical parameter associated with each grid block comprises an X-direction transmissibility, a Y-direction transmissibility, a Z-direction transmissibility, and a permeability;
   c. determining an amount of hydrocarbon associated with each of said plurality of grid blocks, said amount of hydrocarbon associated with each grid block of said plurality of grid blocks being greater than or equal to zero;

d. identifying each of said plurality of grid blocks having an amount of hydrocarbon associated therewith greater than zero, thereby identifying a plurality of hydrocarbon blocks;
e. flagging as nonproductive each of said plurality of hydrocarbon blocks that is not in fluid communication with the well and setting equal to zero said amount of hydrocarbon associated with each of said flagged hydrocarbon blocks, thereby obtaining a modified discritized model;
f. using at least said permeability of each of said plurality of grid blocks to upscale said modified discritized model, thereby producing an upscaled subsurface model, and, using at least assigned X-direction transmissibility, said Y-direction transmissibility, and said Z-direction transmissibility of each of said plurality of grid blocks to produce an upscaled transmissibility model;
g. performing a dynamic reservoir computer simulation using at least said up scaled subsurface model and said upscaled transmissibility model, thereby obtaining simulation results; and,
h. using at least a portion of said simulation results to control a production of hydrocarbons from the well.

7. The method of producing hydrocarbons from a well in fluid communication with at least one subsurface hydrocarbon reservoir according to claim 6, wherein the hydrocarbons are selected from a group consisting of oil, gas, and, a combination of oil and gas.

8. A method of producing hydrocarbons from a well in fluid communication with at least one subsurface hydrocarbon reservoir, comprising the steps of:
a. forming a model of a subsurface of the earth including at least a portion of said subsurface hydrocarbon reservoir, thereby forming a subsurface model;
b. discritizing said subsurface model, thereby obtaining a plurality of grid blocks representative of said subsurface model, and,
   assigning at least one physical parameter value to each grid block of said plurality of grid blocks, wherein said at least one physical parameter comprises a permeability and an X-direction transmissibility, a Y-direction transmissibility, and a Z-direction transmissibility;
c. allocating at least a portion of the hydrocarbons in the subsurface formation to a plurality of said grid blocks, thereby creating a plurality of hydrocarbon blocks, thereby obtaining a modified discritized model;
d. using at least said assigned permeability of each of said plurality of grid blocks to upscale said subsurface model, thereby producing an upscaled subsurface model comprised of at least two upscaled subsurface grid blocks, and,
   using at least said assigned X-direction transmissibility, said Y-direction transmissibility, and said Z-direction transmissibility of each of said plurality of grid blocks to produce an upscaled transmissibility model commensurate in size with upscaled subsurface model, and,
   performing a dynamic reservoir computer simulation using at least said up scaled subsurface model model and said upscaled transmissibility model, thereby obtaining initial simulation results;
e. using a mass balance equation to add an additional quantity of hydrocarbons to at least one grid block of said modified discritized model that is in fluid communication with the well, thereby creating a modified simulation result;
f. performing a dynamic reservoir computer simulation using at least said modified simulation result, thereby obtaining a final simulation result; and,
g. using at least a portion of said final simulation result to manage production of the hydrocarbons via the well.

9. The method of producing hydrocarbons from a well in fluid communication with at least one subsurface hydrocarbon reservoir according to claim 8, wherein the hydrocarbons are selected from a group consisting of oil, gas, and, a combination of oil and gas.

* * * * *